United States Patent
Lee

(10) Patent No.: US 6,741,209 B2
(45) Date of Patent: May 25, 2004

(54) POSITIONING SYSTEM

(75) Inventor: Nicholas Charles Lee, Salisbury (GB)

(73) Assignee: Roke Manor Research Limited, Romsey (GB)

(*) Notice: Subject to any disclaimer, the term of this patent is extended or adjusted under 35 U.S.C. 154(b) by 0 days.

(21) Appl. No.: 10/266,940

(22) Filed: Oct. 9, 2002

(65) Prior Publication Data

US 2003/0125875 A1 Jul. 3, 2003

(30) Foreign Application Priority Data

Oct. 10, 2001 (GB) .............................. 0124301
Nov. 5, 2001 (GB) .............................. 0126482

(51) Int. Cl.[7] ............................ G01S 3/02; H04B 7/185
(52) U.S. Cl. ............. 342/463; 342/357.08; 342/357.14; 342/458; 701/216; 701/221
(58) Field of Search ................. 342/357.14, 357.08, 342/463, 457, 458; 701/216, 218

(56) References Cited

U.S. PATENT DOCUMENTS

| | | | |
|---|---|---|---|
| 5,311,195 A | * | 5/1994 | Mathis et al. ............... 342/463 |
| 5,757,317 A | | 5/1998 | Buchler et al. |
| 5,848,373 A | * | 12/1998 | DeLorme et al. ...... 342/357.13 |
| 6,167,347 A | | 12/2000 | Lin |
| 6,246,376 B1 | * | 6/2001 | Bork et al. ............ 342/357.13 |
| 6,430,498 B1 | * | 8/2002 | Maruyama et al. .... 342/357.08 |
| 6,459,990 B1 | * | 10/2002 | McCall et al. ............... 701/221 |
| 6,480,152 B2 | * | 11/2002 | Lin et al. ................ 342/357.14 |

FOREIGN PATENT DOCUMENTS

| | | |
|---|---|---|
| GB | 2344677 | 6/2000 |
| WO | 97/14048 | 4/1997 |

OTHER PUBLICATIONS

Y. Morioka et al., An anti–car collision system using GPS and 5.8 GHz inter–vehicle communication at an off–sight intersection, IEEE Vehicular Technology Conference, vol. 5, p. 2019–2024, Sep. 2000.*

* cited by examiner

Primary Examiner—Thomas H. Tarcza
Assistant Examiner—F H Mull
(74) Attorney, Agent, or Firm—Crowell & Moring LLP

(57) ABSTRACT

The invention provides a positional system intended to supplement positional information derived by means of a Global Positioning System (GPS), so as to provide positional data coverage in situations where the GPS data may be unreliable, for example due to local attenuation of satellite signals, in order to permit members of a group traversing difficult terrain to retain reasonably accurate information as to the whereabouts of the other group members should the GPS system fail. The positional system of the invention provides each group member with a readily transportable and relatively inexpensive inertial navigation system to generate approximate positional data and utilises radio location techniques to improve the accuracy of the approximate positional data.

19 Claims, 3 Drawing Sheets

FIG 1A
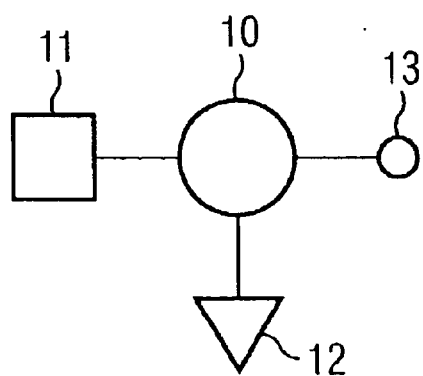
FIG 1B
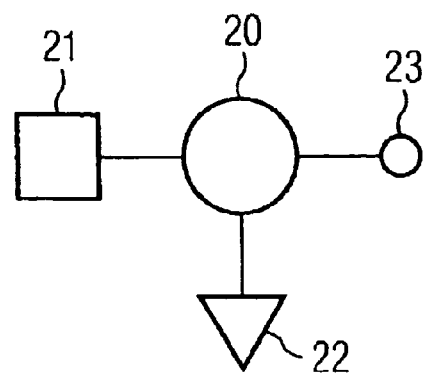
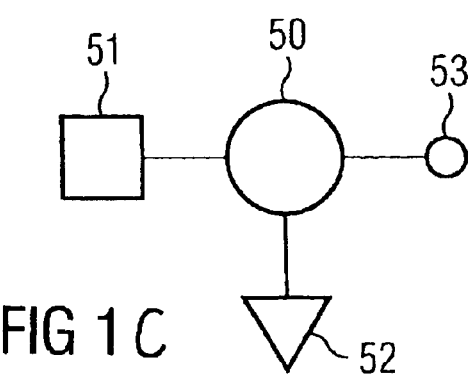
FIG 1C
FIG 1D
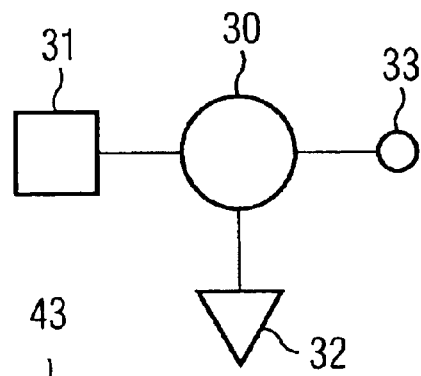
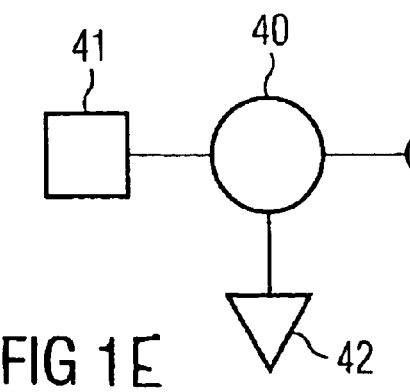
FIG 1E

POSITIONING SYSTEM

BACKGROUND OF THE INVENTION

This invention relates to positioning systems, and it relates more particularly to such systems as can be used to supplement positional information derived by means of a Global Positioning System (GPS), so as to provide positional data coverage in situations where the GPS data may be unreliable, for example due to environmental attenuation of satellite signals.

The invention finds especial, though not exclusive, application in circumstances where several members of a group of people, each having their own GPS, enter together terrain in which for some reason, for example as a result of its being thickly wooded or otherwise highly vegetated, heavily attenuates the satellite signals, receipt of which is necessary for the OPS to function. In the event of a loss of the GPS data, the members of the group can lose touch both with one another and, in certain situations, this can be hazardous, since one or more of the members may become disorientated and lost and they may stray into a dangerous or hostile environment. Moreover, should any of the people in the group become ill or injured, assistance may be delayed in reaching them because their whereabouts are not known, or are not known to sufficient accuracy.

It is feasible for each person in the group to track and store the absolute positional information, derived from GPS data, relating to all of the other members and, in the event of failure of the communication channels on which GPS relies, to extrapolate from the last known positions using data derived from an inertial navigation system, provided that all members of the group are equipped with such systems and the wherewithal to use the results so provided.

However, since inertial navigational systems are based upon measuring accelerations detected by an accelerometer, and such detected information has to be integrated twice in order to produce positional data, any measurement error associated with the accelerometer becomes multiplied by the square of the time. Thus, position errors accumulate exponentially with time.

Of course, the use of highly accurate accelerometers can mitigate this problem, to some extent at least, but such accelerometers tend to be bulky and expensive, thus impractical for use in the field by individual group members.

SUMMARY OF THE INVENTION

This invention seeks to address the above problem and, according to the invention from one aspect, there is provided a positioning system for indicating to each member of a group information indicative of the respective locations of other members of the group, wherein each said member is provided with relatively inexpensive and readily transportable inertial navigation equipment in order to provide positional information, active means to generate additional positional data, and means utilising said additional data to compensate, at least in part, for inaccuracies in the positional information provided by the inertial navigation equipment.

In one preferred embodiment, the inertial guidance equipment is based upon solid state micro electro-mechanical systems (MEMS) accelerometers, as such devices are light, compact and relatively inexpensive.

Preferably, the active means to generate said additional positional data includes a two-way radio system; the signals transmitted by all of the radio systems being distinguishable from one another. By this means, with relatively lightweight and inexpensive equipment, two or three-dimensional corrective data can be applied to the positional information as to the locations of the respective group members, provided by their inertial navigation systems.

In preferred embodiments, the radio systems and/or processing means associated therewith include means for determining the distance travelled by radio signals received from other group members.

The distance determination based upon the reception of radio signals may conveniently be based upon phase measurements of signals locked in phase to that of a carrier originally transmitted by a receiving radio. Alternatively, the distance measurement may be derived by correlating transmissions and receptions with an accurately synchronised time base or, as a further alternative, pulsed transmissions can be used.

It is further preferred that the radio signals are used to compute a mean position for the members of the group, against which the inertial navigational data can be related to effect said compensation.

In any event it is preferred that the group members are all provided with individual GPS equipments and the system of the invention is used to provide information as to the whereabouts of the group members during periods when GPS is inoperative.

The system may be actuated manually in response to observance of GPS failure. Preferably, however, the GPS failure is detected automatically and the system is energised automatically.

In some circumstances it is preferred that the system be energised periodically, even when the GPS system is functioning, in order to provide for a self-check and to monitor its performance against the GPS. In instances where inadequate performance is detected, an audible and/or visual warning is preferably provided to alert the user to the fact that the back-up system is under-performing, and that the system should be checked.

According to another aspect of the invention there is provided a method for a group of mobile objects to determine the absolute position of each member of the group, the method comprising: using an inertial navigation system to generate data indicative of the absolute positions of the objects; receiving signals transmitted between the mobile objects and processing the signals to generate data indicative of the relative positions of the objects; processing the relative position data to generate corrective data; and correcting the absolute position data in accordance with the corrective data.

According to another aspect of the invention there is provided an apparatus for use by a group of mobile objects to determine the position of each member of the group, the apparatus comprising: an inertial navigation system for generating data indicative of the absolute positions of the objects; equipment for receiving signals transmitted between the mobile objects and processing the signals to generate data indicative of the relative positions of the objects; and processing means for processing the relative position data to generate corrective data and correcting the absolute position data in accordance with the corrective data.

BRIEF DESCRIPTION OF THE DRAWINGS

In order that the invention may be clearly understood and readily carried into effect, one embodiment thereof will now be described, by way of example only, with reference to the accompanying drawings, of which:

FIGS. 1A–1E show, schematically, a group of people each carrying the components enabling them to take advantage of a system according to one example of the invention, and show how the system inter-relates data derived from such components;

DETAILED DESCRIPTION OF THE DRAWINGS

Figure 2:
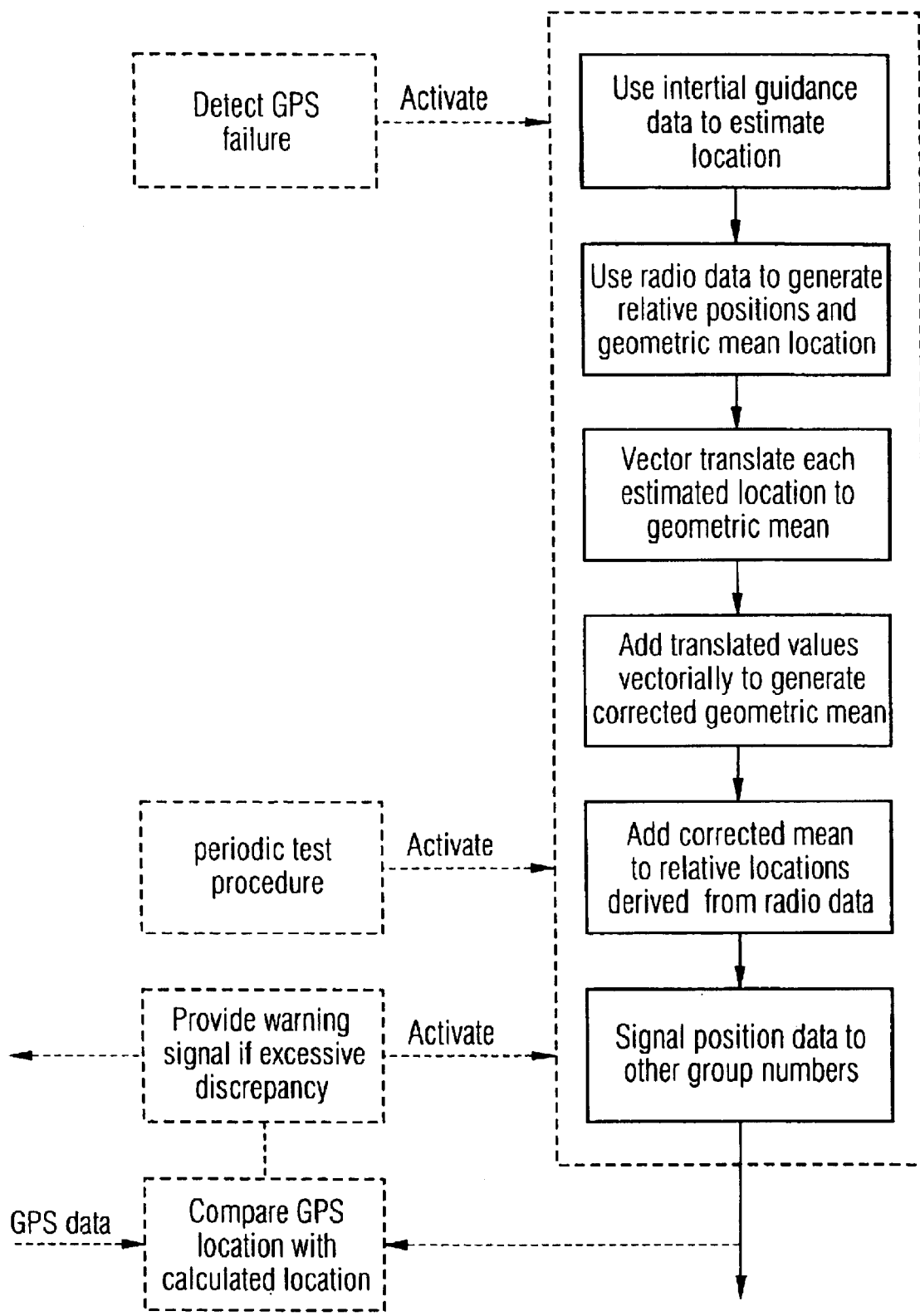
FIG. 2 shows schematically an operational sequence for the system.

Referring now to FIGS. 1A–1E, the individual members of a group of five people travelling in a common environment are indicated by respective circles labelled 10, 20, 30, 40 and 50.

The group members each carry respective GPS equipment, as indicated by squares 11, 21, 31, 41 and 51 linked to each of the circles. Normally, this equipment is effective to determine the individual locations of all members of the group, and the coordinates of each of these individual locations are relayed to the other group members in any convenient manner.

As mentioned previously, however, there are some circumstances in which the communication signals essential to the operation of the GPS equipment can be attenuated to such an extent as to render the equipment ineffective, and thus, where this happens and the group members are mobile, and particularly where they are independently mobile and otherwise out of touch with one another, the locations of the various group members soon become subject to a significant degree of uncertainty.

The invention addresses the issue of providing back-up information that can be used during periods when the GPS communication signals fail, to determine the locations of the various group members with a reasonable degree of accuracy.

Thus, in accordance with one aspect of this example of the invention, each group member also carries a respective inertial navigation system, illustrated in FIGS. 1A–1E by the triangles 12, 22, 32, 42 and 52; these systems being based upon the use of relatively light and compact, thus readily transportable, and inexpensive accelerometers, such as solid state MEMS accelerometers, as mentioned previously. Used alone, however, the cumulative errors associated with the dual integration of somewhat inaccurate source data (i.e. electrical output signals derived from the accelerometers) would, in the absence of up-dating GPS information, provide inadequate information as to the location of the respective group members.

In accordance with this example of the invention, however, each member of the group also carries a radio system, as illustrated by the small circles 13, 23, 33, 43 and 53 respectively. The radios each send out signals that can be distinguished from the signals sent out by the radios of all other group members. Each group member's radio can receive the signals from the radios of all the other group members and, either in each of the radios themselves or in respective associated control boxes, there is provided electronic circuitry of any convenient kind to determine the distance travelled by each received signal from its point of transmission (i.e. the respective location of a group member), thereby to permit accurate evaluation of the distances between the various group members. Given sufficient members in a group, their relative locations in three dimensions can be determined from these distance measurements.

This information of itself is insufficient to determine the absolute position of the entire group in the absence of GPS data, even taking into account the last known locations determined with the advantage of GPS. Such information is, however, sufficient to significantly improve the accuracy of the information provided by the inertial navigation systems 12 to 52, and this example of the invention provides for such improvement.

The respective inertial guidance systems 12 to 52 permit the generation, for each team member, of an indication of location, each of which, as previously mentioned, is subject to drift error that increases aggressively with time. These locations are, however, compared with location information derived form the radio-based systems 13 to 53 to generate correction data.

The geometric mean of the locations determined by means of the radio-based systems 13 to 53, is evaluated, and a vector translation of each of the indications of location derived from the inertial navigation systems 12 to 52 are vectorially translated to the geometric mean position, thus providing a set of absolute location values, one for each member of the group, clustered around the true geometric mean position of the absolute (true) locations of all of the group members.

In view of the fact that the sources of the errors in the data derived from the inertial navigation systems are essentially random and thus will statistically occur in different directions, the vectorial averaging of the aforementioned cluster of locations identifies a location that is closer than any of the individual measurements to the true absolute geometric centre.

Having thus determined at least a good approximation to the true absolute location of the geometric centre of the locations of the individual group members, this information is added to the radio-determined relative positions to give a good approximation to the absolute location of each team member. In this way, the errors intrinsic to the inertial guidance system become averaged out, thereby improving the positional information supplied to the individual group members during periods of failure of the GPS data. This process is summarised in FIG. 2.

Figure 3A:
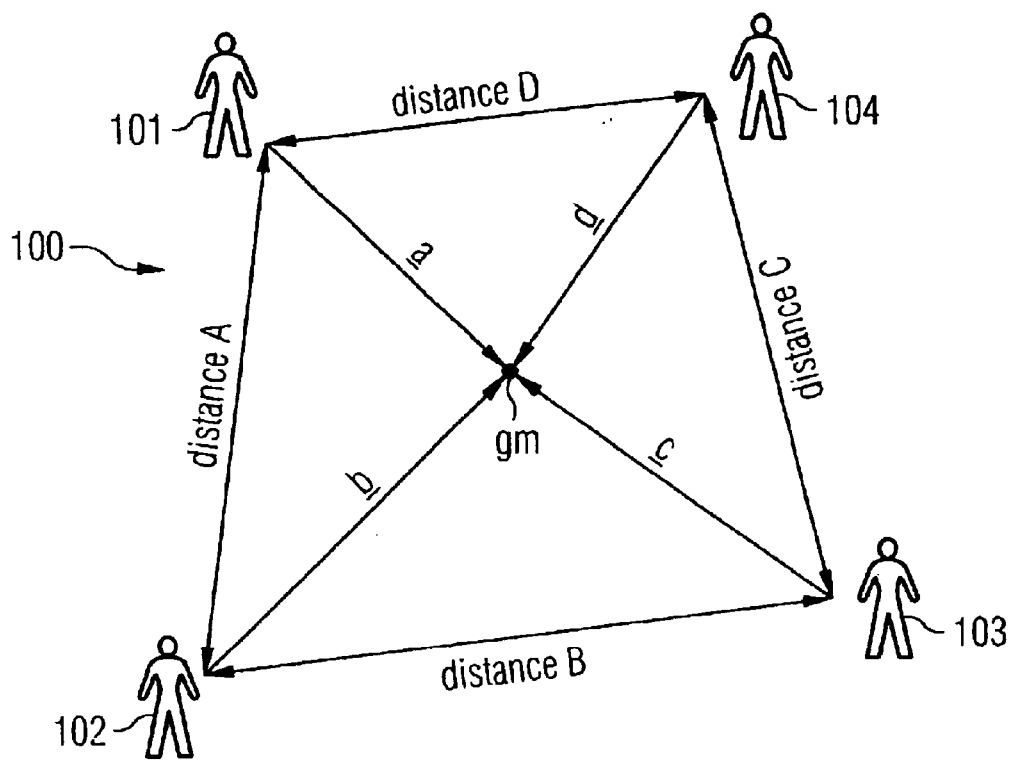
FIGS. 3a and 3b are schematic diagrams of a group of people implementing an embodiment of the invention.

An example of the invention will now be described with respect to FIGS. 3a and 3b. FIG. 3a illustrates a group 100 comprising four people 101 to 104. Each person 101 to 104 is equipped with an inertial navigation system (not shown) and a radio system (not shown) of the types described above.

The radio systems are used to transmit signals between the group members and time of flight measurements are made in order to measure the distance from one person to the next. The respective distances between persons 101 and 102 (distance A), persons 102 and 103 (distance B) persons 103 and 104 (distance C) and persons 101 and 104 (distance D) are measured. These four distances are made known to the equipment of all four people.

A local co-ordinate system is defined in which person 101 is at the origin and the notional line between person 101 and person 102 is the base line. The distance information derived from the radio systems is used to determine the relative locations of the people 101 to 104 in the local co-ordinate system, as well as the geometric mean (gm) of these relative locations.

Vectors a, b, c and d are defined as being the respective vectors from the relative locations of persons 101, 102, 103 and 104 to the geometric mean (gm).

The inertial navigation system of each person 101 to 104 provides a personal measure of that person's absolute location. These measurements include drift error vector components that are likely different for each person. The measured absolute location of each person is made known to the equipment of the other people.

Figure 3B:
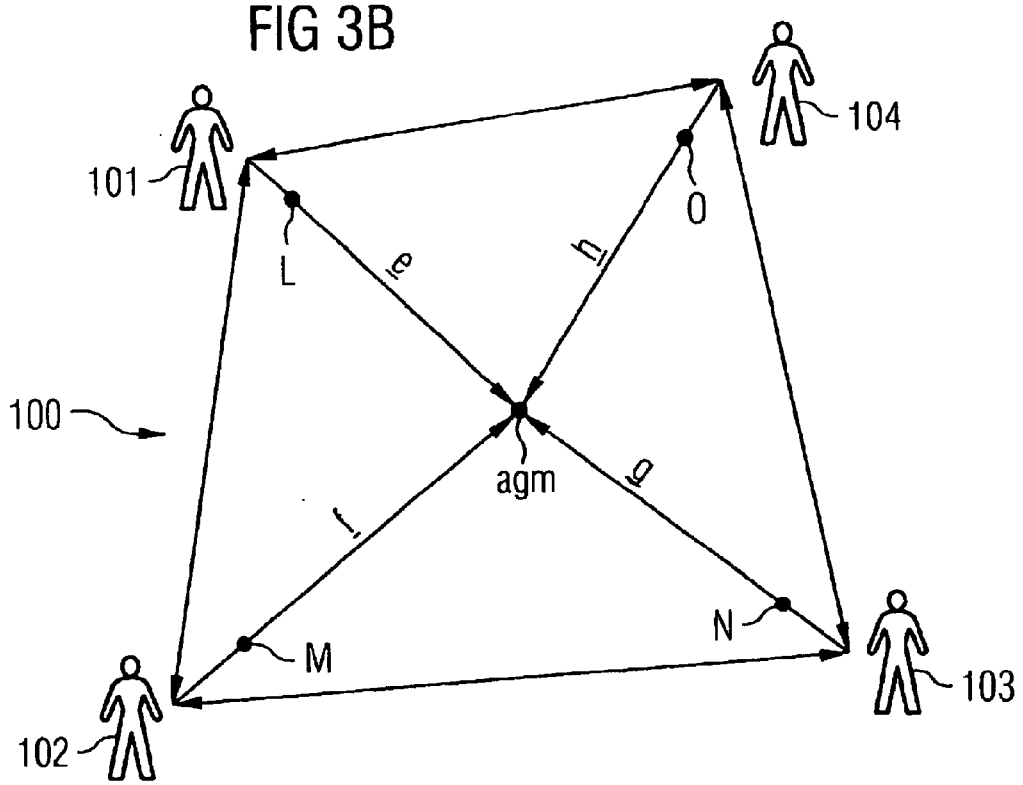

As is illustrated in FIG. 3b, these measurements are averaged to determine the absolute geometric mean (agm) of the absolute locations. Vectors e, f, g and h are defined as being the respective vectors from the measured absolute locations of persons 101, 102, 103 and 104 to the absolute geometric mean (agm).

A corrected measurement of the absolute location of person 101 is taken as being the location (L) on vector e that is distant from the absolute geometric mean (agm) by an amount equal to the length of vector a.

This process is repeated for persons 102 to 104. Thus, a corrected measurement of the absolute location of person 102 is taken as being the location (M) on vector f that is distant from the absolute geometric mean (agm) by an amount equal to the length of vector b. Likewise, a corrected measurement of the absolute location of person 103 is taken as being the location (N) on vector g that is distant from the absolute geometric mean (agm) by an amount equal to the length of vector c.

Similarly, a corrected measurement of the absolute location of person 104 is taken as being the location (O) on vector h that is distant from the absolute geometric mean (agm) by an amount equal to the length of vector d.

It will be appreciated that, this technique does not correct for certain systematic rotation errors in the inertial navigation systems because the radio system only provides distance measurements, not rotation measurements.

Enhanced performance is obtained by providing each person with an independent measure of rotation, such as an electronic compass, allowing the absolute rotation of vectors a, b, c and d to be determined, rather than just their lengths.

This would enable persons 101 to 104 to correct their absolute location measurements by the vector subtraction of vector e from vector a, vector f from vector b, vector g from vector c, and vector h from vector d, respectively.

Preferably, the results from all person's compasses would be averaged together to provide the best measure of where north is.

In general, the more members that a group contains, the better will be the accuracy of the positional information derived as described above.

The radios used in the systems 13 to 53 can, of course, also be used for the transmission of voice or other data between group members if desired.

In circumstances where it is the intention that a system of the invention be used purely as a back-up to GPS data, daring periods when, for any reason, the GPS is ineffective or inoperative, and since the errors in the inertial navigational system build up with time, it is preferable that the back-up system does not run continuously in parallel with the receipt of GPS data, but is activated only when the GPS data fails. Thus it is preferred that the system senses failure of the GPS communications and automatically triggers the operation of the back-up system.

In such circumstances, however, it is desirable that the back-up system be caused to operate periodically, in parallel with the GPS, so that its accuracy can be checked by comparison with the locations obtained from the GPS, and gross errors reported in the form of a warning that the back-up system may be defective.

Since, in a practical environment, it is likely that the GPS communications may fail for some, but not all, of the group members, it is preferred that, when at least one group member experiences a GPS communications failure, the back-up system components of the other members are also energised, so that the back-up data are available for the member or members experiencing GPS communications failure. Where appropriate in such circumstances, however, the true locations, as measured by GPS, of those members of the group still receiving GPS communications, may be automatically input into the back-up system, instead of the locations derived from the error-prone inertial navigational data.

With regard to the techniques used to derive distance information from the transmissions of the radio systems 13 to 53, any convenient technique can be used, such as (by way of example only):

(a) techniques based upon phase measurements of signals locked in phase to that of a carrier originally transmitted by a receiving radio;

(b) correlating transmissions and receptions with an accurately synchronised time base; or (c) techniques based upon pulsed transmissions.

The sequence of system procedures described above is shown schematically and by way of example only on FIG. 2; with optional features being shown in dashed outline.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for a group of mobile objects to determine the absolute position of each member of the group, the method comprising:

using an inertial navigation system to generate data indicative of the absolute positions of the objects;

receiving signals transmitted between the mobile objects and processing the signals to generate data indicative of the relative positions of the objections;

processing the relative position data to generate corrective data; and correcting the absolute position data in accordance with the corrective data.

2. A method according to claim 1, the method comprising; determining the geometric mean of the relative positions of the objects; using the geometric mean to generate the corrective data.

3. A method according to claim 2, the method comprising; determining the distances of the relative positions of the objects from the geometric mean; and correcting the absolute position data in dependence upon the determined distances.

4. A method according to claim 1, wherein time of flight measurements of the signals transmitted between the mobile objects are used to generate the relative position data.

5. A method according to claim 4 wherein the signals are transmitted by radio equipment.

6. An apparatus for use by a group of mobile objects to determine the position of each member of the group, the apparatus comprising:

an inertial navigation system for generating data indicative of the absolute positions of the objects;

equipment for receiving signals transmitted between the mobile objects and processing the signals to generate data indicative of the relative positions of the objects; and processing means for processing the relative position data to generate corrective data and correcting the absolute position data in accordance with the corrective data.

7. A system according to claim 6, wherein the inertial guidance equipment incorporates solid state micro electro-mechanical systems (MEMS) accelerometers.

8. An arrangement wherein members of a group of people are provided with individual GPS equipments and a system according to claim 6 is used to provide information as to the whereabouts of the group members during periods when GPS is inoperative.

9. An arrangement according to claim 8, wherein the system is activated manually in response to observance of GPS failure.

10. An arrangement according to claim 8, wherein the system is activated automatically in response to GPS failure.

11. An arrangement according to claim 8, wherein the system is activated periodically, even when the GPS system is functioning, in order to provide for a self-check and to monitor its performance against the GPS.

12. An arrangement according to claim 11 wherein, where inadequate performance is detected, an audible and/or visual warning is provided to -alert the user to the fact that the back-up system is under-performing, and that the system should be checked.

13. An apparatus according to claim 6 wherein the processing means is arranged to determine the geometric mean of the relative positions of the objects and to use the geometric mean to generate the corrective data.

14. An apparatus according to claim 13 wherein the processing means is arranged to determine the distances of the relative positions of the objects from the geometric mean; and to correct the absolute position data in dependence upon the determined distances.

15. An apparatus according to claim 6, wherein the equipment uses time of flight measurements of signals transmitted between the mobile objects to generate the relative position data.

16. An apparatus according to claim 15 wherein the equipment is radio equipment.

17. An apparatus according to claim 16 wherein the radio equipment comprises a set of radio units, each member of the group being provided with a radio unit from the set of radio units.

18. An apparatus according to claim 6, wherein the inertial navigation system comprises a set of inertial navigation units, each member of the group being provided with an inertial navigation unit from the set of inertial navigation units.

19. A system for a group of mobile objects to determine the absolute position of one or more members of the group, the system comprising:

means for generating data that coarsely indicates the absolute positions of the objects of the group;

measuring means for measuring the relative positions of the objects of the group; and processing means for refining the absolute position data in dependence upon the measured relative positions of the objects of the group to generate refined absolute position data indicating more accurately the absolute positions of one or more members of the group.

* * * * *